US011553500B2

(12) United States Patent
Chendamarai Kannan et al.

(10) Patent No.: US 11,553,500 B2
(45) Date of Patent: Jan. 10, 2023

(54) UE ASSISTED TCI STATE SIGNALING FOR INTERFERENCE COORDINATION

(71) Applicant: QUALCOMM Incorporated, San Diego, CA (US)

(72) Inventors: Arumugam Chendamarai Kannan, San Diego, CA (US); Vinay Chande, San Diego, CA (US); Tao Luo, San Diego, CA (US); Xiaoxia Zhang, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/037,118

(22) Filed: Sep. 29, 2020

(65) Prior Publication Data

US 2021/0100006 A1 Apr. 1, 2021

Related U.S. Application Data

(60) Provisional application No. 62/908,410, filed on Sep. 30, 2019.

(51) Int. Cl.
*H04W 72/08* (2009.01)
*H04W 72/04* (2009.01)
(Continued)

(52) U.S. Cl.
CPC ........ *H04W 72/082* (2013.01); *H04B 7/0486* (2013.01); *H04B 7/0626* (2013.01);
(Continued)

(58) Field of Classification Search
None
See application file for complete search history.

(56) References Cited

U.S. PATENT DOCUMENTS

| 2010/0033374 | A1* | 2/2010 | van Rensburg | ........ H01Q 25/00 |
| | | | | 342/368 |
| 2011/0182375 | A1* | 7/2011 | Kim | .................. H04W 72/0426 |
| | | | | 375/260 |

(Continued)

FOREIGN PATENT DOCUMENTS

| EP | 3373636 A1 * | 9/2018 | ............. H04B 17/21 |
| EP | 3379747 A1 | 9/2018 | |

(Continued)

OTHER PUBLICATIONS

International Search Report and Written Opinion—PCT/US2020/053415—ISA/EPO—dated Nov. 27, 2020.

(Continued)

*Primary Examiner* — Anh Vu H Ly
(74) *Attorney, Agent, or Firm* — Norton Rose Fulbright US LLP

(57) ABSTRACT

In a particular implementation, a method of wireless communication includes detecting, at a user equipment (UE) associated with a first base station, one or more interfering beams generated by a second base station. The second base station is a neighboring base station of the first base station. The method also includes transmitting, from the UE to the first base station, an interference identification message indicating the one or more interfering beams. The method further includes receiving, from the first base station, a scheduling message indicating a set of beams of the second base station that are scheduled for use in upcoming transmissions.

29 Claims, 9 Drawing Sheets

(51) Int. Cl.
  *H04W 72/12* (2009.01)
  *H04B 17/318* (2015.01)
  *H04B 7/0456* (2017.01)
  *H04B 7/06* (2006.01)
  *H04L 5/00* (2006.01)
  *H04W 56/00* (2009.01)

(52) U.S. Cl.
  CPC ......... *H04B 17/318* (2015.01); *H04L 5/0051* (2013.01); *H04W 56/001* (2013.01); *H04W 72/046* (2013.01); *H04W 72/0493* (2013.01); *H04W 72/1226* (2013.01); *H04W 72/1263* (2013.01)

(56) References Cited

U.S. PATENT DOCUMENTS

| | | | | |
|---|---|---|---|---|
| 2013/0053079 | A1* | 2/2013 | Kwun | H04B 7/0617 455/509 |
| 2015/0215873 | A1* | 7/2015 | Jeong | H04W 52/243 455/522 |
| 2015/0373572 | A1* | 12/2015 | Sahin | H04W 16/10 370/252 |
| 2016/0183232 | A1* | 6/2016 | Stirling-Gallacher | H04L 5/0085 370/280 |
| 2018/0124796 | A1* | 5/2018 | Noh | H04B 1/1027 |
| 2018/0269951 | A1* | 9/2018 | Takano | H04B 7/0617 |
| 2018/0351668 | A1* | 12/2018 | Kim | H04B 7/02 |
| 2019/0181922 | A1 | 6/2019 | Lee et al. | |
| 2019/0238208 | A1* | 8/2019 | Tang | H04W 24/10 |
| 2020/0260358 | A1* | 8/2020 | Ratnam | H04W 24/10 |
| 2020/0367125 | A1* | 11/2020 | Yoon | H04W 36/38 |
| 2020/0383118 | A1* | 12/2020 | Park | H04W 24/08 |
| 2021/0100017 | A1* | 4/2021 | Chendamarai Kannan | H04B 7/0456 |
| 2021/0160798 | A1* | 5/2021 | Zheng | H04W 76/19 |

FOREIGN PATENT DOCUMENTS

| | | |
|---|---|---|
| EP | 3522666 A1 | 8/2019 |
| WO | WO-2016173656 A1 | 11/2016 |

OTHER PUBLICATIONS

Nokia, et al., "Enhancements on Multi-Beam Operation", 3GPP Draft, 3GPP TSG RAN WG1 #97 Meeting, R1-1907317, 3rd Generation Partnership Project (3GPP), Mobile Competence Centre, 650, Route Des Lucioles, F-06921, Sophia-Antipolis Cedex France, vol. RAN WG1, No. Reno, Nevada, USA, May 13, 2019-May 17, 2019, May 13, 2019 (May 13, 2019), XP051728756, 22 pages, Retrieved from the Internet: URL: http://www.3gpp.org/ftp/Meetings%5F3GPP%5FSYNC/RAN1/Docs/R1%2D1907317%2Ezip [retrieved on May 13, 2019] sections 2 and 3, the Whole Document.

* cited by examiner

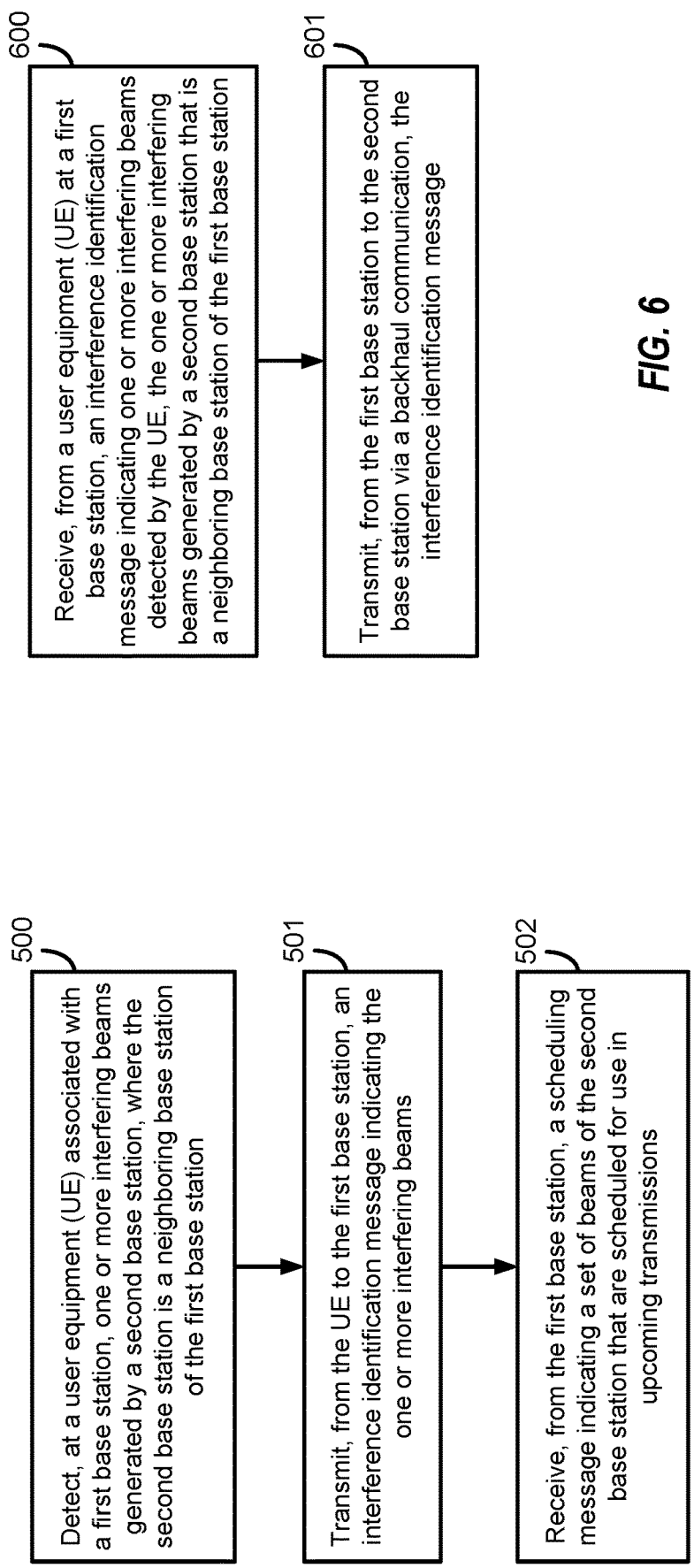

UE ASSISTED TCI STATE SIGNALING FOR INTERFERENCE COORDINATION

CROSS-REFERENCE TO RELATED APPLICATIONS

This application claims the benefit of U.S. Provisional Patent Application No. 62/908,410, entitled, "UE ASSISTED TCI STATE SIGNALING FOR INTERFERENCE COORDINATION," filed on Sep. 30, 2019, which is expressly incorporated by reference herein in its entirety.

TECHNICAL FIELD

Aspects of the present disclosure relate generally to wireless communication systems, and more particularly, to user equipment (UE) assisted transmission configuration indication (TCI) state signaling for interference coordination.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME ASPECTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes detecting, at a user equipment (UE) associated with a first base station, one or more interfering beams generated by a second base station. The second base station is a neighboring base station of the first base station. The method also includes transmitting, from the UE to the first base station, an interference identification message indicating the one or more interfering beams. The method further includes receiving, from the first base station, a scheduling message indicating a set of beams of the second base station that are scheduled for use in upcoming transmissions.

In an additional aspect of the disclosure, an apparatus configured for wireless communication is disclosed. The apparatus includes at least one processor, and a memory coupled to the at least one processor. The at least one processor is configured to detect, at a user equipment (UE) associated with a first base station, one or more interfering beams generated by a second base station. The second base station is a neighboring base station of the first base station. The at least one processor is also configured to initiate transmission, from the UE to the first base station, of an interference identification message indicating the one or more interfering beams. The at least one processor is further configured to receive, from the first base station, a scheduling message indicating a set of beams of the second base station that are scheduled for use in upcoming transmissions.

In an additional aspect of the disclosure, an apparatus configured for wireless communication is disclosed. The apparatus includes means for detecting, at a user equipment (UE) associated with a first base station, one or more interfering beams generated by a second base station. The second base station is a neighboring base station of the first base station. The apparatus also includes means for transmitting, from the UE to the first base station, an interference identification message indicating the one or more interfering beams. The apparatus further includes means for receiving, from the first base station, a scheduling message indicating a set of beams of the second base station that are scheduled for use in upcoming transmissions.

In an additional aspect of the disclosure, a non-transitory computer-readable medium stores instructions that, when executed by a processor, cause the processor to perform operations including detecting, at a user equipment (UE) associated with a first base station, one or more interfering beams generated by a second base station. The second base station is a neighboring base station of the first base station. The operations also include initiating transmission, from the UE to the first base station, of an interference identification message indicating the one or more interfering beams. The operations further include receiving, from the first base station, a scheduling message indicating a set of beams of the second base station that are scheduled for use in upcoming transmissions.

In an additional aspect of the disclosure, a method of wireless communication includes receiving, from a user equipment (UE) at a first base station, an interference identification message indicating one or more interfering beams detected by the UE. The one or more interfering beams are generated by a second base station that is a neighboring base station of the first base station. The method further includes transmitting, from the first base station to the second base station via a backhaul communication, the interference identification message.

In an additional aspect of the disclosure, an apparatus configured for wireless communication is disclosed. The apparatus includes at least one processor, and a memory coupled to the at least one processor. The at least one processor is configured to receive, from a user equipment (UE) at a first base station, an interference identification message indicating one or more interfering beams detected by the UE. The one or more interfering beams are generated by a second base station that is a neighboring base station of the first base station. The at least one processor is further configured to initiate transmission, from the first base station to the second base station via a backhaul communication, of the interference identification message.

In an additional aspect of the disclosure, an apparatus configured for wireless communication is disclosed. The apparatus includes means for receiving, from a user equipment (UE) at a first base station, an interference identification message indicating one or more interfering beams detected by the UE. The one or more interfering beams are generated by a second base station that is a neighboring base station of the first base station. The apparatus further includes means for transmitting, from the first base station to the second base station via a backhaul communication, the interference identification message.

In an additional aspect of the disclosure, a non-transitory computer-readable medium stores instructions that, when executed by a processor, cause the processor to perform operations including receiving, from a user equipment (UE) at a first base station, an interference identification message indicating one or more interfering beams detected by the UE. The one or more interfering beams are generated by a second base station that is a neighboring base station of the first base station. The operations further include initiating transmission, from the first base station to the second base station via a backhaul communication, of the interference identification message.

In an additional aspect of the disclosure, a method of wireless communication includes receiving, from a first base station at a second base station via a backhaul communication, an interference identification message indicating one or more interfering beams detected by a user equipment (UE). The one or more interfering beams are generated by the second base station. The second base station is a neighboring base station of the first base station. The method also includes generating, at the second base station, a scheduling message indicating a set of beams of the second base station that are scheduled for use in upcoming transmissions. The method further includes transmitting, from the second base station to the first base station via a second backhaul communication, the scheduling message.

In an additional aspect of the disclosure, an apparatus configured for wireless communication is disclosed. The apparatus includes at least one processor, and a memory coupled to the at least one processor. The at least one processor is configured to receive, from a first base station at a second base station via a backhaul communication, an interference identification message indicating one or more interfering beams detected by a user equipment (UE). The one or more interfering beams are generated by the second base station. The second base station is a neighboring base station of the first base station. The at least one processor is also configured to generate, at the second base station, a scheduling message indicating a set of beams of the second base station that are scheduled for use in upcoming transmissions. The at least one processor is further configured to initiate transmission, from the second base station to the first base station via a second backhaul communication, of the scheduling message.

In an additional aspect of the disclosure, an apparatus configured for wireless communication is disclosed. The apparatus includes means for receiving, from a first base station at a second base station via a backhaul communication, an interference identification message indicating one or more interfering beams detected by a user equipment (UE). The one or more interfering beams are generated by the second base station. The second base station is a neighboring base station of the first base station. The apparatus also includes means for generating, at the second base station, a scheduling message indicating a set of beams of the second base station that are scheduled for use in upcoming transmissions. The apparatus further includes means for transmitting, from the second base station to the first base station via a second backhaul communication, the scheduling message.

In an additional aspect of the disclosure, a non-transitory computer-readable medium stores instructions that, when executed by a processor, cause the processor to perform operations including receiving, from a first base station at a second base station via a backhaul communication, an interference identification message indicating one or more interfering beams detected by a user equipment (UE). The one or more interfering beams are generated by the second base station. The second base station is a neighboring base station of the first base station. The operations also include generating, at the second base station, a scheduling message indicating a set of beams of the second base station that are scheduled for use in upcoming transmissions. The operations further include initiating transmission, from the second base station to the first base station via a second backhaul communication, of the scheduling message.

Other aspects, features, and implementations of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, various aspects of the present disclosure may include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method implementations, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 is a block diagram of example blocks executed by a UE configured according to an aspect of the present disclosure.

FIG. 6 is a block diagram of example blocks executed by a base station configured according to an aspect of the present disclosure.

DETAILED DESCRIPTION

Figure 1:
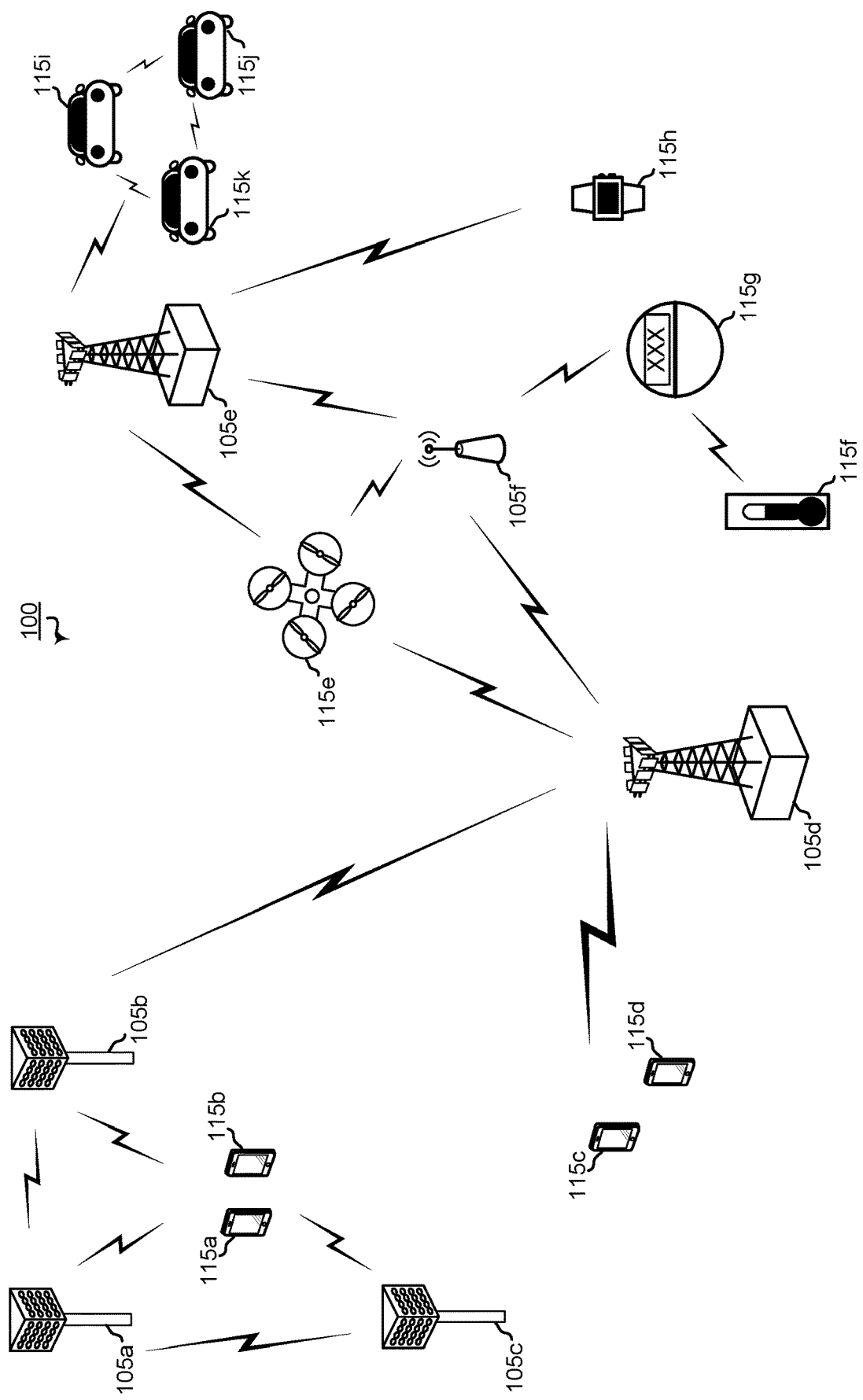
FIG. 1 is a block diagram illustrating details of a wireless communication system according to some aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The electromagnetic spectrum is often subdivided, based on frequency (or wavelength), into various classes, bands or channels. In fifth generation (5G) new radio (NR), two initial operating bands have been identified as frequency range designations FR1 (410 MHz–7.125 GHz) and FR2 (24.25 GHz–52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band/spectrum in documents and articles, despite being different than the extremely high frequency (EHF) band (30 GHz–300 GHz) which is identified by the International Telecommunications Union (ITU) as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

This disclosure relates generally to providing or participating in communication as between two or more wireless devices in one or more wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some aspects. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise aspects of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 may support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
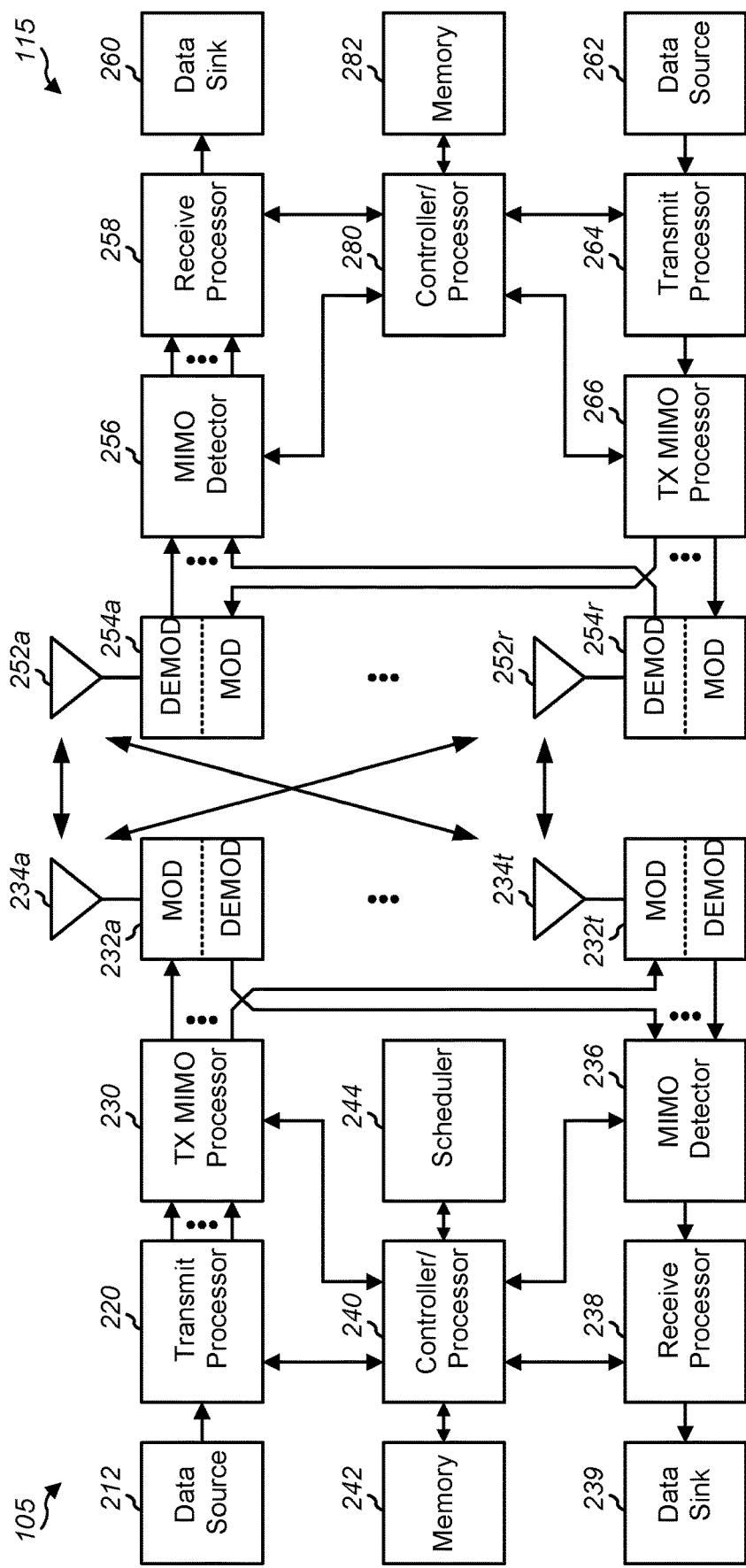
FIG. 2 is a block diagram conceptually illustrating a design of a base station and a UE configured according to some aspects of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 5-7, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In communication systems with beamformed operation (e.g., a system where devices communicate via multiple beams), such as, but not limited to, millimeter wave (mm-Wave) systems, interference observed by a receiver may depend on multiple factors. For example, interference observed by a receiver depends on the beam direction on which the receiver is listening, and the beam direction from which the interference comes from. For this reason, depending on scheduling decisions of a serving cell and neighboring cells, the interference seen by a UE may vary significantly. For example, if a neighboring cell (e.g., a neighboring base station) transmits on a beam in the same direction of the UE, the UE may experience significant interference when receiving a signal from a serving cell (e.g., a serving base station). Alternatively, if the neighboring cell transmits on a beam that is directed away from the UE, the UE may experience little to no interference when receiving a signal from the serving cell.

Time-varying, beam-dependent interference may cause problems in a wireless communication system. For example, a UE channel quality indicator (CQI) report may be based on interference at a first time slot, but during a later time slot of transmission or reception, the interference may be different (e.g., due to scheduling of different beams at the neighboring cell). This difference in interference may lead to under-estimation (e.g., if the CQI is based on less interference) or over-estimation (e.g., if the CQI is based on more interference) of the channel quality, which may result in throughput loss. As another example, the UE may be unable to achieve a target block error rate (BLER) due to high interference during at least one time slot, which may result in outer loop destabilization and throughput loss. As still another example, the UE may select a different antenna panel due to interference from a neighboring cell, which may result in difficulty receiving or transmitting from or to the serving cell, resulting in throughput loss.

Systems and methods of accounting for time-varying, beam-dependent interference are described herein. To illustrate, aspects of the present disclosure describe UE assisted transmission configuration indication (TCI) signaling for interference coordination. For example, a UE may detect one or more beams of a neighboring base station that cause interference at the UE, and the UE may transmit an interference identification message that indicates the one or more beams to a serving base station. The serving base station may transmit the interference identification message to the neighboring base station via a backhaul communication. The neighboring base station receives the interference identification message and, in some implementations, schedules a set of beams for upcoming transmissions based on the interference identification message. For example, the neighboring base station may schedule an interfering beam for transmission during a time when the UE is not scheduled to transmit or receive data. Alternatively, the neighboring base station may not take into account the interference identification message when scheduling, but the neighboring base station may reply with a scheduling message, and the serving base station, the UE, or both, may perform operations to account for interference caused by the set of beams. In this manner, the time-varying, beam-dependent interference may be accounted for and throughput loss may be reduced or prevented.

Figure 3:
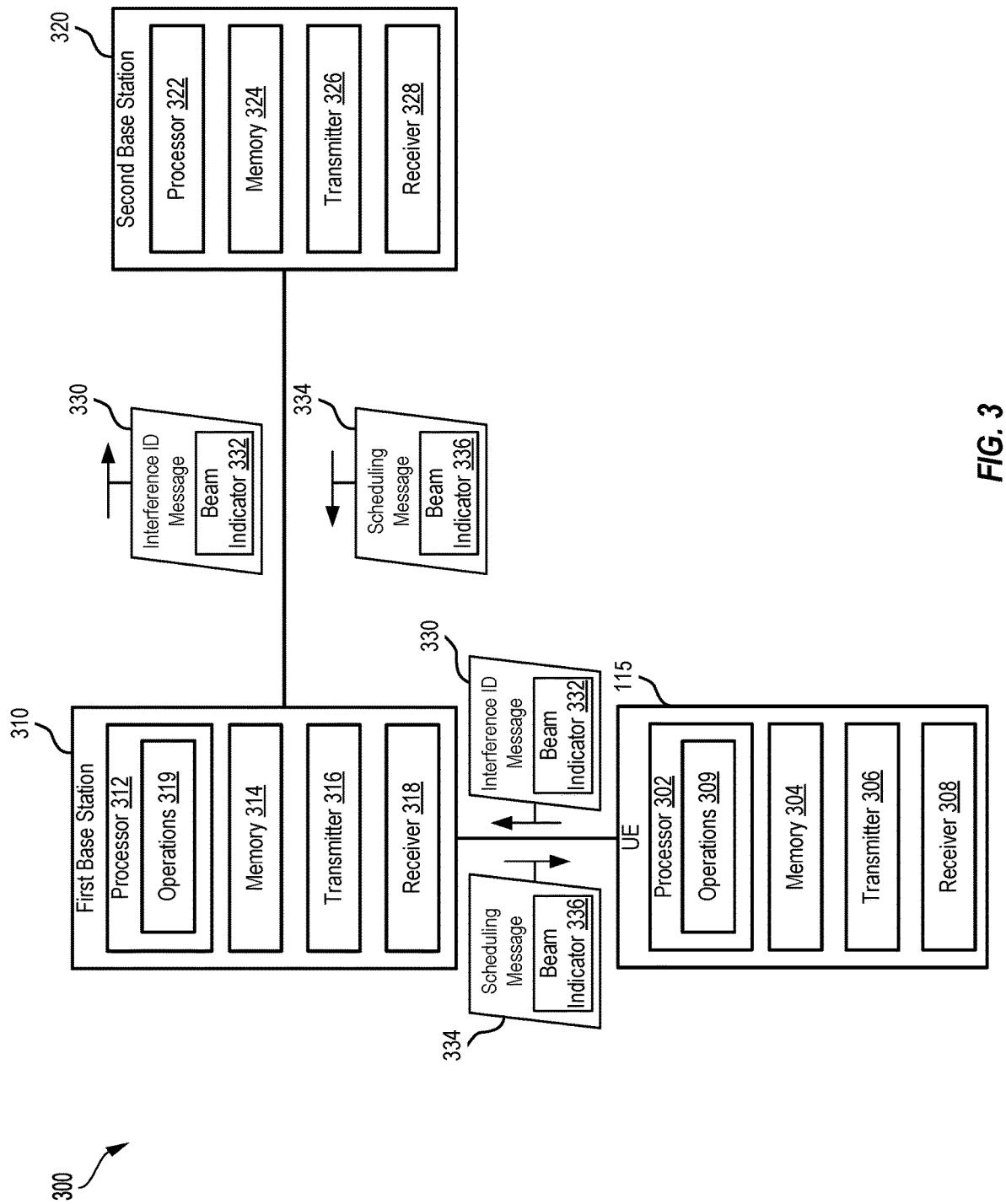
FIG. 3 is a block diagram of a system configured to provide an interference identification message from a UE to a neighboring base station.

FIG. 3 is a block diagram of an example wireless communications system 300 configured to provide a scheduling message from a neighboring base station to a base station (e.g., a serving cell of one or more UEs). In some examples, wireless communications system 300 may implement aspects of wireless network 100. For example, wireless communications system 300 may include UE 115. Wireless communications system 300 may also include a first base station 310 and a second base station 320. Although one UE and two base stations are illustrated, in other implementations, wireless communications system 300 may include multiple UEs 115, more than two base stations, or both.

UE 115 includes a processor 302, a memory 304, a transmitter 306, and a receiver 308. Processor 302 may be configured to execute instructions stored at memory 304 to perform the operations described herein. In some implementations, processor 302 includes or corresponds to controller/processor 280, and memory 304 includes or corresponds to memory 282.

Transmitter 306 is configured to transmit data to one or more other devices, and receiver 308 is configured to receive data from one or more other devices. For example, transmitter 306 may transmit data, and receiver 318 may receive data, via a network, such as a wired network, a wireless network, or a combination thereof. For example, UE 115 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 306 and receiver 308 may be replaced with a transceiver. Additionally, or alternatively, transmitter 306, receiver 308, or both may include or correspond to one or more components of UE 115 described with reference to FIG. 2.

First base station 310 includes processor 312, memory 314, transmitter 316, and receiver 318. Processor 312 may be configured to execute instructions stored at memory 314 to perform the operations described herein. In some implementations, processor 312 includes or corresponds to controller/processor 240, and memory 314 includes or corresponds to memory 242.

Transmitter 316 is configured to transmit data to one or more other devices, and receiver 318 is configured to receive data from one or more other devices. For example, transmitter 316 may transmit data, and receiver 318 may receive data, via a network, such as a wired network, a wireless network, or a combination thereof. For example, first base station 310 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 316 and receiver 318 may be replaced with a transceiver. Additionally, or alternatively, transmitter 316, receiver, 318, or both may include or correspond to one or more components of base station 105 described with reference to FIG. 2.

Second base station 320 includes processor 322, memory 324, transmitter 326, and receiver 328. Processor 322 may be configured to execute instructions stored at memory 324 to perform the operations described herein.

Transmitter 326 is configured to transmit data to one or more other devices, and receiver 328 is configured to receive data from one or more other devices. For example, transmitter 326 may transmit data, and receiver 328 may receive data, via a network, such as a wired network, a wireless network, or a combination thereof. For example, second base station 320 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 326 and receiver 328 may be replaced with a transceiver. Additionally, or alternatively, transmitter 326, receiver, 328, or both may include or correspond to one or more components of base station 105 described with reference to FIG. 2.

In a particular implementation, wireless communications system 300 implements a fifth generation (5G) New Radio (NR) network. For example, wireless communications system 300 may include multiple 5G-capable UEs 115 and multiple 5G-capable base stations, such as first base station 310 and second base station 320, that are configured to operate in accordance with a 5G NR network protocol such as that defined by the 3GPP. In some implementations, wireless communications system 300 is configured to support wireless communications, such as between UE 115 and first base station 310, in the mmWave band or other high frequencies. Such communications may be performed using narrower, direction beams as compared to communications in the Sub-6 GHz band.

In the example illustrated in FIG. 3, first base station 310 is a serving base station of UE 115, and second base station 320 is a neighboring base station of first base station 310. For example, UE 115 may be located within a first serving cell served by first base station 310, and a neighboring second serving cell may be served by second base station 320. Because the serving cells are neighbors, transmission beams generated by second base station 320 may cause interference with communications between UE 115 and first base station 310.

During operation of wireless communication system 300, UE 115 may associate with first base station 310. For example, UE 115 may enter a serving cell of first base station 310. Second base station 320 is a neighboring base station to first base station 310 (e.g., a serving cell served by second base station 320 neighbors the serving cell served by first base station 310). Thus, transmission beams from second base station 320 may cause interference at UE 115.

To determine which beams from second base station 320 may cause interference at UE 115, UE 115 may detect one or more interfering beams generated by second base station 320. For example, UE 115 may perform one or more detection operations to detect one or more interfering beams (e.g., the "dominant interferers") generated by second base station 320. In some implementations, the one or more interfering beams correspond to interference that satisfies an interference threshold.

In some implementations, detecting the one or more interfering beams includes fixing, at UE 115, receiver spatial quasi co-location (QCL) to first base station 310 and measuring interferer reference signal received power (RSRP). For example, UE 115 may fix receiver spatial QCL to first base station 310 and measure RSRP for the receive beam to first base station 310. In some such implementations, the RSRP is measured based on interferer synchronization signal block (SSB) beams. For example, the reference signal may be one or more SSB beams. In other such implementations, the RSRP is measured based on a channel state information reference signal (CSI-RS). For example, the reference signal may be a CSI-RS. In some other implementations, detecting the one or more interfering beams includes sweeping, at UE 115, receiver spatial QCL across multiple receive beams and measuring RSRP for each receive beam of the multiple receive beams. For example, UE 115 may include multiple antennas, each of which may be capable of generating multiple receive beams, and UE 115 may sweep receiver spatial QCL across the multiple receive beams and measure the RSRP of each receive beam to determine (e.g., detect or identify) the one or more interfering beams.

After detecting the one or more interfering beams, UE 115 may generate an interference identification message 330 indicating the one or more interfering beams. For example, UE 115 may generate a message that includes beam indicators 332 that indicate the one or more interfering beams. Although described as a separate message, in some other implementations, beam indicators 332 of interference identification message 330 may be included in and/or appended to a different already existing message.

After generating interference identification message 330, UE 115 may transmit, to first base station 310, interference identification message 330 indicating the one or more interfering beams. For example, UE 115 may transmit interference identification message 330 to first base station 310 over a wireless connection between UE 115 and first base station 310. First base station 310 may receive, from UE 115, interference identification message 330 indicating one or more interfering beams detected by UE 115. As explained above, the one or more beams may be generated by second base station 320 (e.g., a neighboring base station of first base station 310). Based on receiving interference identification message 330, first base station 310 may transmit, to second base station 320 via a backhaul communication, interference identification message 330. For example, first base station 310 may transmit, via a backhaul connection, interference identification message 330 to second base station 320. The backhaul connection may be wired and/or wireless. In some implementations, interference identification message 330 includes (e.g., beam indicators 332 are) physical cell identity (PCI) information corresponding to the one or more interfering beams and SSB beam identifiers corresponding to the one or more interfering beams, other TCI state references corresponding to the one or more interfering beams, or both.

Figure 4:
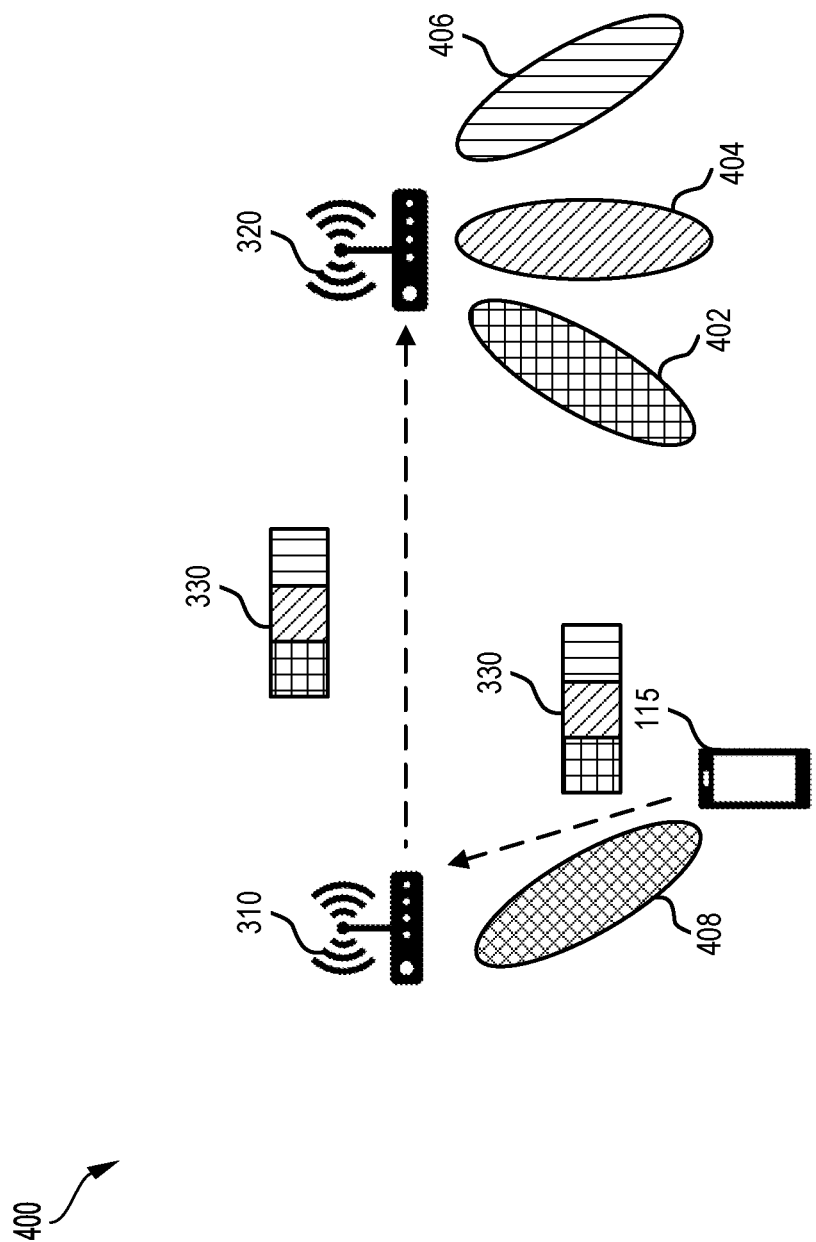
FIG. 4 is a diagram of a system configured to beamform data and to provide an interference identification message from a UE to a neighboring base station.

An example of detecting interfering beams and sending interference identification messages is shown in FIG. 4. FIG.

4 illustrates a wireless communication system 400 configured to beamform data and to provide an interference identification message from a UE to a neighboring base station. Wireless communication system 400 may include or correspond to wireless communication system 300. For example, wireless communication system 400 includes UE 115, first base station 310, and second base station 320.

As shown in FIG. 4, second base station 320 may communicate with UEs within its serving cell via one or more beams, including a first beam 402, a second beam 404, and a third beam 406. As shown in FIG. 4, first beam 402 may be directed in a direction of UE 115. Thus, first beam 402 may cause a large amount of interference to signals received by UE 115 from first base station 310 via fourth beam 408. In addition, due to the direction of second beam 404, second beam 404 may cause some interference at UE 115 (though less than first beam 402). Due to the direction of third beam 406 (e.g., in a direction away from UE 115), third beam 406 is unlikely to cause perceptible interference at UE 115.

To determine which beams cause interference at UE 115, UE 115 may perform one or more detection operations, as described above, to detect one or more interfering beams generated by second base station 320. In the example of FIG. 4, UE 115 may determine that interference caused by first beam 402 satisfies a first threshold, and thus first beam 402 is an interfering beam (e.g., a dominant interferer). Because the interference satisfies the first threshold, first beam 402 may be categorized in a first group of beams corresponding to constrained beams. Additionally, UE 115 may determine that interference caused by second beam 404 does not satisfy the first threshold but does satisfy a second threshold (that is less than the first threshold), and thus second beam 404 is a "somewhat" interfering beam. Because the interference satisfies the second threshold (but not the first threshold), second beam 404 may be categorized in a second group of beams corresponding to partially constrained transmission parameters. Additionally, UE 115 may determine that interference caused by third beam 406 fails to satisfy either threshold, and thus third beam 406 is not an interfering beam. Because the interference fails to satisfy either threshold, third beam 406 may be categorized in a third group of beams corresponding to unconstrained transmission parameters.

UE 115 may generate interference identification message 330 that indicates the groupings of first beam 402, second beam 404, and third beam 406. For example, interference identification message 330 may indicate that first beam 402 is included in the first group (corresponding to constrained beams), second beam 404 is included in the second group (corresponding to partially constrained transmission parameters), and third beam 406 is included in the third group (corresponding to unconstrained beams/transmission parameters). In some implementations, interference identification message 330 may also indicate time slots requested by UE 115 to correspond to particular beams. For example, a first time slot may be requested as a constrained timeslot (e.g., no constrained beams are requested to be scheduled), another time slot may be requested as a partially constrained time slot (e.g., beams are requested to be scheduled with partially constrained transmission parameters), and another time slot may be requested as an unconstrained time slot (e.g., any beam may be scheduled during this time slot). In this manner, UE 115 may assist second base station 320 in scheduling one or more beams for transmission, in some implementations.

After generating interference identification message 330, UE 115 transmits interference identification message 115 to first base station 310 (e.g., the serving base station). First base station 310 may transmit (e.g., forward) interference identification message 330 to second base station 320 via a backhaul communication. In some implementations, second base station 320 may schedule one or more beams for transmission in accordance with interference identification message 330, as further described herein. After scheduling the one or more beams, second base station 320 may transmit a scheduling message to first base station 310 via a second backhaul communication, as further described herein.

Returning to FIG. 3, in some implementations, interference identification message 330 may include interfering beams of multiple neighboring base stations. For example, UE 115 may detect N strongest cells with the top M strongest beams each, where N and M are each integers. In such implementations, interference identification message 330 may be transmitted from first base station 310 to multiple neighboring cells (e.g., multiple neighboring base stations). In some such implementations, the one or more interfering beams may be the strongest beams of a strongest cell, and the strongest cell may correspond to second base station 320. To determine the strongest cell (or the N strongest cells), UE 115 may perform one or more detection operations. For example, UE 115 may determine a maximum RSRP over all beams per cell (of each of the multiple cells) to determine the strongest cell. For example, UE 115 may determine the RSRP of each beam of each cell, and the cell with the highest aggregate RSRP is determined to be the strongest cell. As another example, UE 115 may determine an average RSRP over the strongest beams to determine the strongest cell. For example, the cell with the highest average RSRP of the strongest beams may be determined to be the strongest cell. Determining the strongest cell, or the N strongest cells, may determine (e.g., identify) which base stations the interference identification message 330 is transmitted to (e.g., by first base station 310). After determining which additional cells have strong interfering beams (e.g., dominant interferers), first base station 310 may transmit (e.g., forward), to one or more additional base stations via one or more additional backhaul communications, interference identification message 330. In such implementations, interference identification message 330 may indicate beams (e.g., the M strongest beams) corresponding to each of the one or more additional base stations.

Second base station 320 may receive, from first base station 310 via a backhaul communication, interference identification message 330 indicating the one or more interfering beams detected by UE 115. The one or more interfering beams may be generated by second base station 320. Interference identification message 330 may indicate a request, by UE 115, for information related to the one or more interfering beams or a request for scheduling related to the one or more interfering beams.

After receipt of interference identification message 330, second base station 320 may schedule a set of beams for upcoming transmissions. In some implementations, scheduling the set of beams is independent of interference identification message 330, as further described herein. In some other implementations, scheduling the set of beams is based on interference identification message 330, as further described herein.

Second base station 320 may generate a scheduling message 334 indicating the set of beams of second base station 320 that are scheduled for use in upcoming transmissions. For example, after scheduling the set of beams for use in upcoming transmissions (e.g., in upcoming time slots), second base station 320 may generate scheduling message 334 that indicates the set of beams (and in some implementations, the time slots to which each beam is scheduled). Scheduling message 334 may include beam indicators 336 that indicate the set of beams that are scheduled for upcoming transmissions. Although described as a separate message, in some other implementations, beam indicators 336 of scheduling message 334 may be included in and/or appended to a different already existing message. Scheduling message 334 may correspond to an upcoming time period (e.g., upcoming time slots) so that, even if there is delay on the backhaul between second base station 320 and first base station 310, or delay between first base station 310 and UE 115, the information may reach the appropriate device (e.g., first base station 310 or UE 115) in time that the information is still relevant. For example, scheduling message 334 may correspond to multiple slots (e.g., time slots), and the multiple slots may be upcoming (e.g., future) slots compared to a current slot at first base station 310 and at UE 115. In some implementations, scheduling message 334 may indicate that one or more slots are unscheduled at second base station 320. For example, scheduling message 334 (e.g., beam indicators 336) may include a blank TCI state corresponding to an unscheduled slot.

After generating scheduling message 334, second base station 320 may transmit, to first base station 310 via a second backhaul communication, scheduling message 334. First base station 310 may receive, from second base station 320 via the second backhaul communication, scheduling message 334 indicating the set of beams of second base station 320 that are scheduled for use in upcoming transmissions. After receiving scheduling message 334, first base station 310 may transmit (e.g., forward), to UE 115, scheduling message 334. UE 115 may receive, from first base station 310, scheduling message 334 indicating the set of beams of second base station 320 that are scheduled for use in upcoming transmissions. In this manner, the scheduling of upcoming transmission beams at second base station 320 may be known to first base station 310 and UE 115. In some implementations, first base station 310, UE 115, or both, may perform one or more operations to account for potential interference caused by the set of beams.

In implementations in which interference identification message 330 is sent to one or more additional base stations, first base station 310 may receive, from the one or more additional base stations via one or more second additional backhaul communications, one or more additional scheduling messages indicating one or more sets of beams of the one or more additional base stations that are scheduled for use in upcoming transmissions. After receiving the one or more additional scheduling messages, first base station 310 may transmit (e.g., forward), to UE 115, the one or more additional scheduling messages. In this manner, first base station 310 and UE 115 may have knowledge of scheduling of interfering beams from other neighboring cells (e.g., other neighboring base stations).

In some implementations, second base station 320 may schedule of the set of beams (for upcoming transmission) independent of interference identification message 330. Such implementations may be referred to as "Passive UE Assisted TCI Signaling." In such implementations, second base station 320 may schedule the set of beams based on criterions at second base station 320 and independent of any request in interference identification message 330. However, second base station 320 may provide scheduling message 334 to indicate to first base station 310 and UE 115 the scheduling of the set of beams. In some such implementations, scheduling message 334 may include a list of the set of beams scheduled for transmissions. For example, the list (e.g., beam indicators 336) may be a list of TCI states corresponding to the set of beams scheduled for upcoming transmissions. In some other implementations, scheduling message 334 (e.g., beam indicators 336) may include a bitmap. Each value of the bitmap may correspond to a different beam of the set of beams. For example, a first value (e.g., a '1' value) of a particular bit of the bitmap may indicate that a beam corresponding to the particular bit is scheduled, and a second value (e.g., a '0' value) of the particular bit of the bitmap may indicate that the beam corresponding to the particular bit is not scheduled. The bitmap may correspond to a single neighboring cell or to multiple neighboring cells. The bitmap may have higher specificity than the list of beams for a cell, because the bitmap may indicate particular beams of particular cells.

In some implementations, first base station 310, UE 115, or both may perform one or more operations based on scheduling message 334 to account for interference caused by the set of beams scheduled for upcoming transmissions. For example, first base station 310 may reduce a rank for scheduling transmissions to or from UE 115, reduce a modulation and coding scheme (MCS) corresponding to transmissions to or from UE 115, select a different precoder for scheduling transmissions to or from UE 115, allocate a larger frequency domain for transmissions to or from UE 115, enable slot aggregation for transmissions to or from UE 115, or a combination thereof, as non-limiting examples. As another example, UE 115 may enable a different antenna panel based on the set of beams, enable interference detection and cancellation operations based on the set of beams, perform channel estimation based on previous interference corresponding to the set of beams, or a combination thereof, as non-limiting examples. These operations may reduce or prevent throughput loss that would otherwise be caused by interference from beams of second base station 320.

In some other implementations, second base station 320 may schedule the set of beams (for upcoming transmission) based on interference identification message 330. Such implementations may be referred to as "Active UE Assisted TCI Signaling." In Active UE Assisted TCI Signaling, second base station 320 may use a best effort approach to satisfying requests from UE 115. To illustrate, interference identification message 330 may include multiple groups of beams corresponding to different requests from the UE. For example, the beams may be grouped into a first group, a second group, and a third group. Such description is not limiting, and in other implementations, there may be more than three or less than three groups. The multiple groups of beams may include a first group of beams corresponding to unconstrained transmission parameters. For example, beams that do not correspond to significant interference at UE 115 may be grouped into the first group for which UE 115 does not have any particular requests regarding scheduling. The multiple groups of beams may include a second group of beams corresponding to partially constrained transmission parameters. For example, beams that correspond to interference that satisfies a second threshold, but not a first threshold, may be grouped into the second group for which UE 115 requests that second base station 320 schedule the beams with partially constrained transmission parameters. In some such implementations, the partially constrained transmission parameters include rank, transmission power, precoding, or a combination thereof. The multiple groups of beams may also include a third group of beams corresponding to constrained beams. For example, beams that correspond to interference that satisfies a first threshold may be grouped into the third group for which UE 115 requests that second base station 320 not schedule transmission of the beams at particular times. When second base station 320 schedules the set of beams based on the requests from UE 115, scheduling message 334 indicates a schedule at second base station 320 that takes into account one or more of the different requests from UE 115.

In addition to the groupings of beams, interference identification message 330 may indicate requests by UE 115 corresponding to one or more time slots. For example, interference identification message 330 may indicate requests for one or more unconstrained time slots, one or more partially constrained time slots, one or more constrained time slots, or a combination thereof. Unconstrained time slots may correspond to time slots for which UE 115 does not make a request (e.g., any type of beam may be scheduled). Partially constrained time slots may correspond to time slots during which UE 115 requests that interfering beams (e.g., beams in the first group, the second group, or both) are transmitted with constrained parameters. Constrained time slots may correspond to time slots during which UE 115 requests that interfering beams (e.g., beams in the first group) are not transmitted. In some other implementations, instead of being requested in interference identification message 330, the different types of time slots may be defined by second base station 320, or a ratio of the slots may be defined by a wireless standard.

Second base station 320 may schedule the set of beams based on the requests from UE 115. As an example, second base station 320 may schedule, during the one or more unconstrained time slots, at least one of the one or more interfering beams for transmission. For example, second base station 320 may schedule any one or more of first beam 402, second beam 404, or third beam 406 for transmission during the one or more unconstrained time slots. As another example, second base station 320 may schedule, during the one or more partially constrained time slots, at least one of the one or more interfering beams for transmission with constrained parameters. In some implementations, the constrained parameters include reduced rank, limited transmission power, restricted precoding, or a combination thereof. For example, second base station 320 may schedule first beam 402 during a partially constrained time slot with a reduced rank, limited transmission power, restricted precoding, or a combination thereof. The constrained parameters may be requested by UE 115, selected by second base station 320, or may be specified in one or more wireless communication standards. As another example, second base station 320 may refrain from scheduling, during the one or more constrained time slots, any of the one or more interfering beams for transmission. For example, second base station 320 may refrain from scheduling first beam 402 for transmission during the one or more constrained time slots. Second beam 404 and third beam 406 may still be scheduled during the one or more constrained time slots.

After scheduling the set of beams based on interference identification message 330, second base station 320 may indicate to first base station 310 and to UE 115 whether or not the requests of UE 115 have been met. For example, scheduling message 334 may indicate whether or not the requests included in interference identification message 330 have been met by second base station 320. In some implementations, indications of the requests being met may replace the full schedule, which may reduce the size of scheduling message 334. Additionally, because the slot requests are scheduled with best effort by second base station 320, in some cases, scheduling message 334 may indicate that the requests are not met (e.g., if second base station 320 is unable to meet both the requests from UE 115 and the requirements of second base station 320).

As described above with reference to FIG. 3, wireless communication system 300 may be configured to share interference identification from UEs to neighboring base stations. For example, UE 115 may transmit interference identification message 330 to first base station 310 (e.g., a serving base station), and first base station 310 may transmit interference identification message 330 to second base station 320 via a backhaul communication. By receiving interference identification message 330, second base station 320 may schedule one or more beams for transmission in a manner that reduces interference with transmissions to or from UE 115, thereby reducing or preventing throughput loss that would otherwise be caused by interference from at least some beams generated by second base station 320. In some other implementations, second base station 320 may not schedule beams for transmission based on requests from UE 115, but second base station 320 may send scheduling message 334 to first base station 310 via a second backhaul communication, and first base station 310 may transmit scheduling message 334 to UE 115. By receiving information (e.g., TCI states) of a schedule of upcoming beams that are to be used for transmissions by second base station 320, first base station 310, UE 115, or both, may perform operations that may reduce or prevent throughput loss that would otherwise be caused by interference from at least some beams generated by second base station 320.

Figure 8:
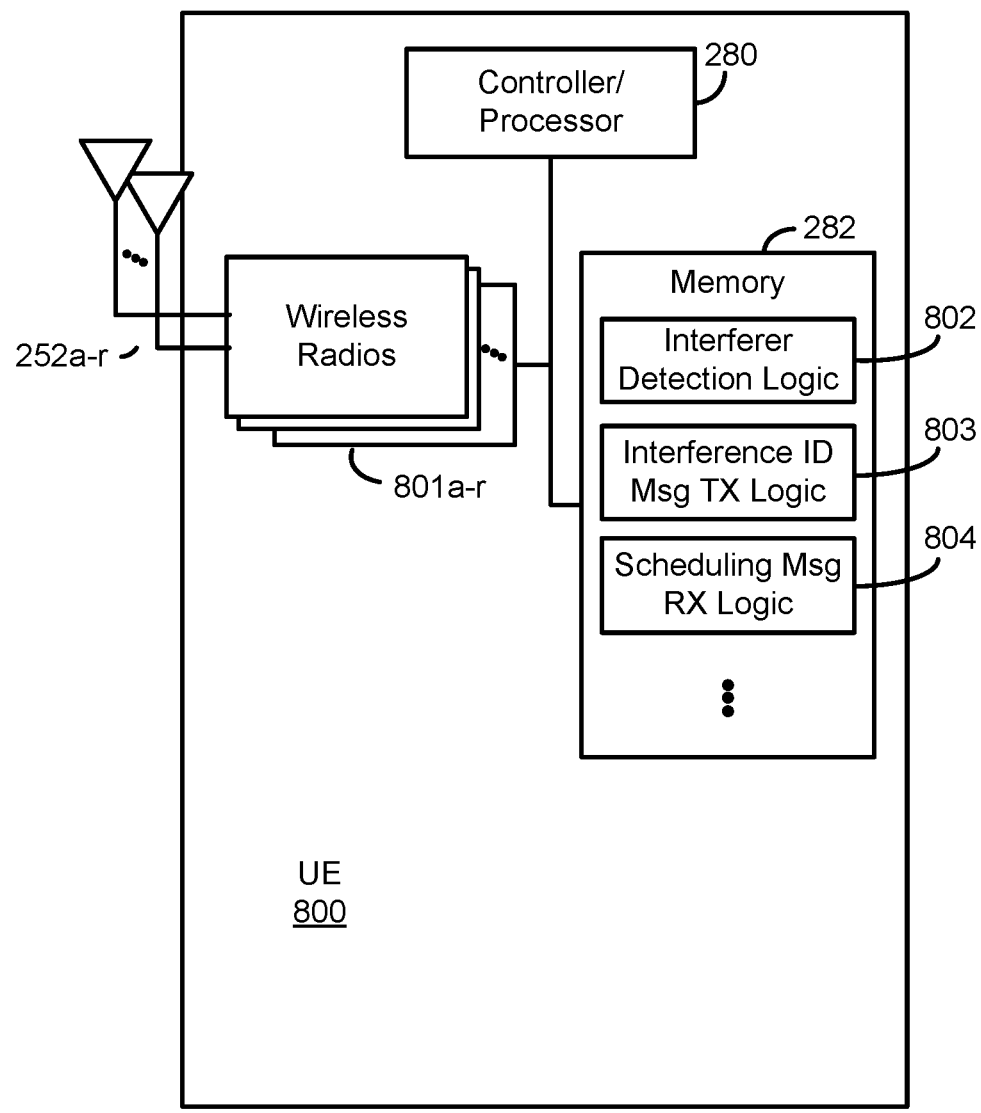
FIG. 8 is a block diagram conceptually illustrating a design of a UE configured to transmit an interference identification message according to some aspects of the present disclosure.

FIG. 5 is a block diagram illustrating example blocks executed to implement one or more aspects of the present disclosure. The example blocks will also be described with respect to UE 800 as illustrated in FIG. 8. FIG. 8 is a block diagram illustrating UE 800 configured according to one or more aspects of the present disclosure. In some implementations, UE 800 includes or corresponds to UE 115 of FIGS. 1-4. UE 800 may include the structure, hardware, and components as illustrated for UE 115 of FIG. 2. For example, UE 800 may include controller/processor 280, which operates to execute logic or computer instructions stored in memory 282, as well as controlling the components of UE 800 that provide the features and functionality of UE 800. UE 800, under control of controller/processor 280, may transmit and receive signals via wireless radios 801*a-r* and antennas 252*a-r*. Wireless radios 801*a-r* may include various components and hardware, as illustrated in FIG. 2 for UE 115, including modulator/demodulators 254*a-r*, MIMO detector 256, receive processor 258, transmit processor 264, and TX MIMO processor 266.

At block 500, a UE associated with a first base station detects one or more interfering beams generated by a second base station. The second base station is a neighboring base station of the first base station. For example, UE 800 may execute, under control of controller/processor 280, interferer detection logic 802 stored in memory 282. The execution environment of interferer detection logic 802 provides the functionality for UE 800 to detect one or more interfering beams generated by a second base station. In some implementations, execution of interferer detection logic 802 may cause UE 800 to fix receiver spatial QCL to the first base station and to measure interferer RSRP (e.g., based on SSB beams or CSI-RS, as non-limiting examples). In some other implementations, execution of interferer detection logic 802 may cause UE 800 to sweep receiver spatial QCL across multiple receive beams measure RSRP for each reference beam of the multiple receive beams (e.g., based on SSB beams or CSI-RS, as non-limiting examples).

At block 501, the UE transmits, to the first base station, an interference identification message indicating the one or more interfering beams. For example, UE 800 may execute, under control of controller/processor 280, interference identification message transmit logic 803 stored in memory 282. The execution environment of interference identification message transmit logic 803 provides the functionality for UE 800 to transmit, to a first base station via antenna 252*a-r*, an interference identification message indicating the one or more interfering beams.

At block 502, the UE receives, from the first base station, a scheduling message indicating a set of beams of the second base station that are scheduled for use in upcoming transmissions. For example, UE 800 may execute, under control of controller/processor 280, scheduling message receive logic 804 stored in memory 282. The execution environment of scheduling message receive logic 804 provides the functionality for UE 800 to receive, from the first base station via antennas 252*a-r*, a scheduling message indicating a set of beams of the second base station that are scheduled for use in upcoming transmission.

Figure 9:
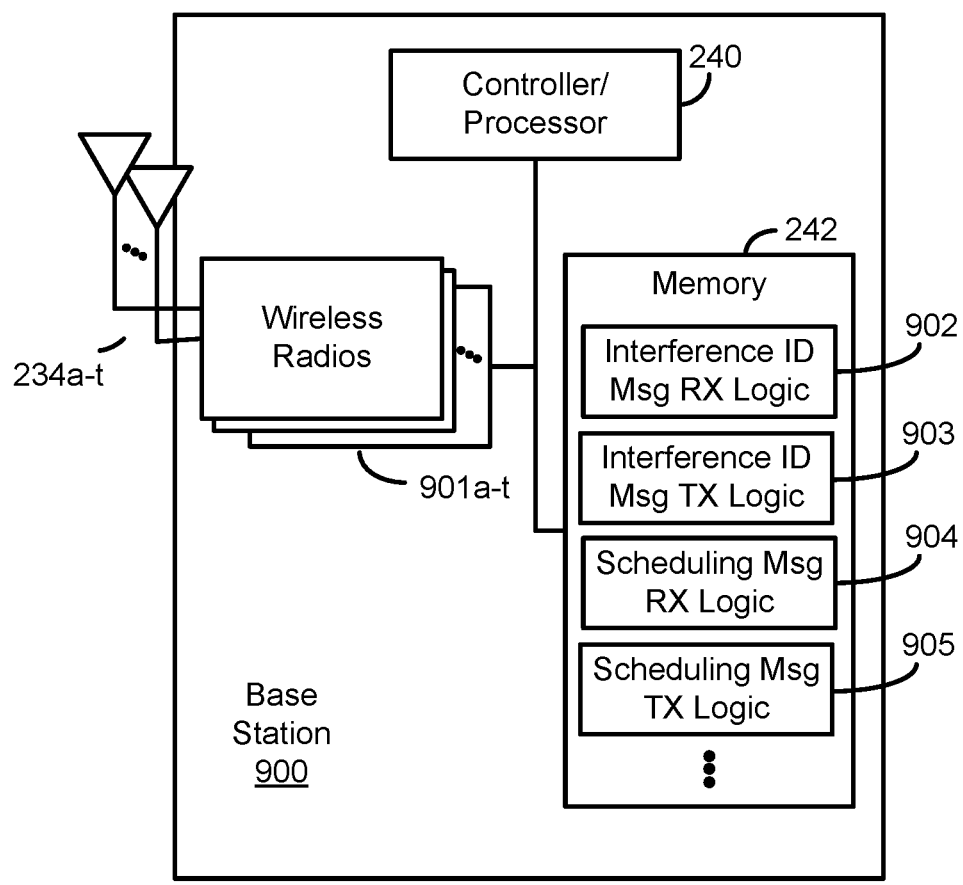
FIG. 9 is a block diagram conceptually illustrating a design of a base station configured to receive an interference identification message from a UE and transmit the interference identification message to a neighboring base station according to some aspects of the present disclosure.

FIG. 6 is a block diagram illustrating example blocks executed to implement one or more aspects of the present disclosure. The example blocks will also be described with respect to base station 900 as illustrated in FIG. 9. FIG. 9 is a block diagram illustrating base station 900 configured according to one or more aspects of the present disclosure. In some implementations, base station 900 may include or correspond to base station 105 of FIGS. 1 and 2 or first base station 310 of FIGS. 3 and 4. Base station 900 may include the structure, hardware, and components as illustrated for base station 105 of FIG. 2. For example, base station 900 may include controller/processor 240, which operates to execute logic or computer instructions stored in memory 242, as well as controlling the components of base station 900 that provide the features and functionality of base station 900. Base station 900, under control of controller/processor 240, may transmit and receive signals via wireless radios 901*a-t* and antennas 234*a-t*. Wireless radios 901*a-t* may include various components and hardware, as illustrated in FIG. 2 for base station 105, including modulator/demodulators 232*a-t*, MIMO detector 236, receive processor 238, transmit processor 220, and TX MIMO processor 230.

At block 600, a first base station receives, from a UE, an interference identification message indicating one or more interfering beams detected by the UE. The one or more interfering beams are generated by a second base station that is a neighboring base station of the first base station. For example, base station 900 may execute, under control of controller/processor 240, interference identification message receive logic 902 stored in memory 242. The execution environment of interference identification message receive logic 902 provides the functionality for base station 900 to receive, via antennas 234*a-t*, an interference identification message indicating one or more interfering beams generated by a second base station and detected by a UE.

At block 601, the first base station transmits, to the second base station via a backhaul communication, the interference identification message. For example, base station 900 may execute, under control of controller/processor 240, interference identification message transmit logic 903 stored in memory 242. The execution environment of interference identification message transmit logic 903 provides the functionality for base station 900 to transmit, to the second base station via a backhaul communication, the interference identification message.

In some implementations, the first base station may receive, from the second base station via a second backhaul communication, a scheduling message indicating a set of beams of the second base station that are scheduled for use in upcoming transmissions. For example, base station 900 may execute, under control of controller/processor 240, scheduling message receive logic 904 stored in memory 242. The execution environment of scheduling message receive logic 904 provides the functionality for base station 900 to receive, from the second base station via a second backhaul communication, a scheduling message indicating a set of beams of the second base station that are scheduled for use in upcoming transmissions. In some such implementations, the first base station may transmit, to the UE, the scheduling message. For example, base station 900 may execute, under control of controller/processor 240, scheduling message transmit logic 905 stored in memory 242. The execution environment of scheduling message transmit logic 905 provides the functionality for base station 900 to transmit, to the UE via antennas 234*a-t*, the scheduling message.

Figure 7:
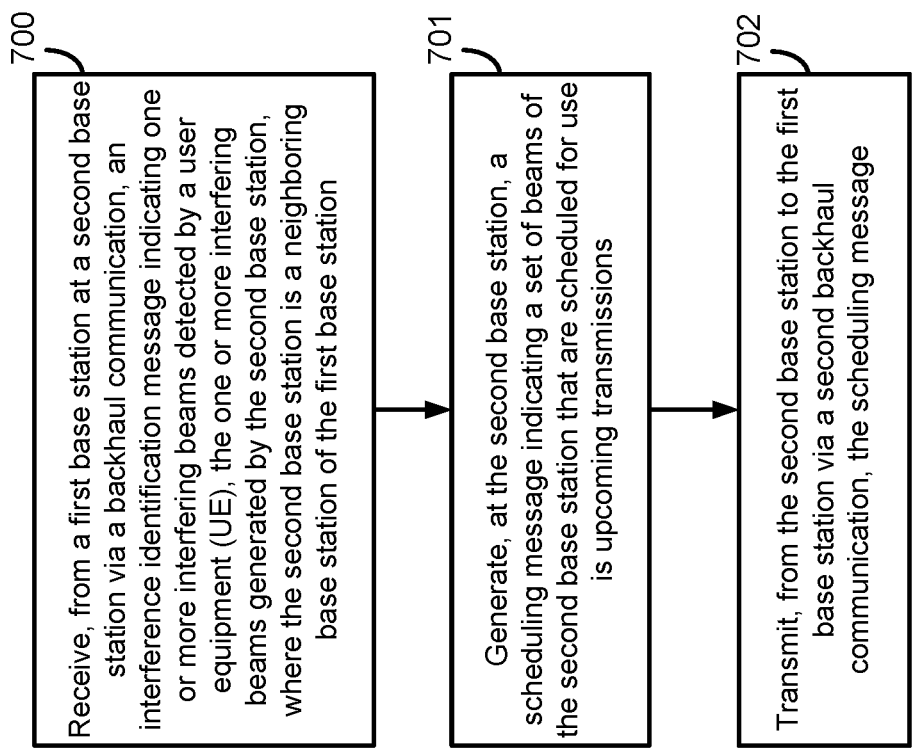
FIG. 7 is a block diagram of example blocks executed by a base station configured according to an aspect of the present disclosure.
Figure 10:
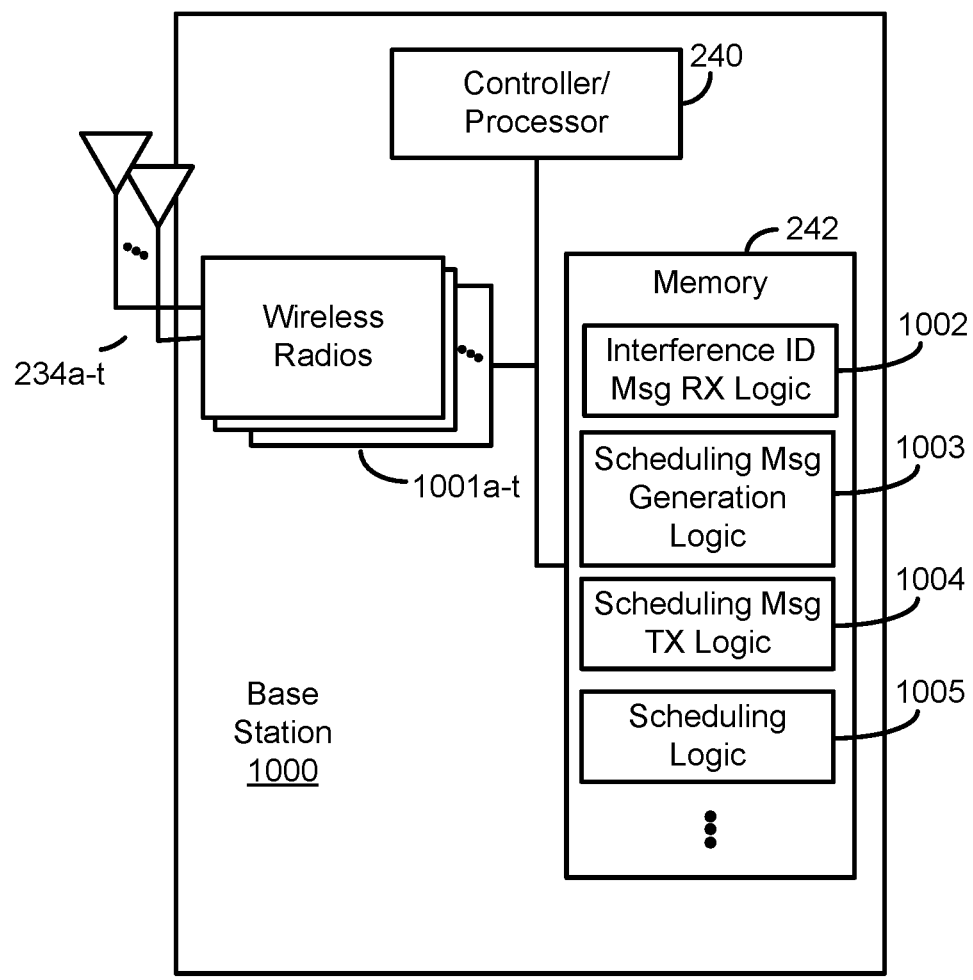
FIG. 10 is a block diagram conceptually illustrating a design of a base station configured to receive an interference identification message from a neighboring base station and to transmit a scheduling message to the neighboring base station according to some aspects of the present disclosure.

FIG. 7 is a block diagram illustrating example blocks executed to implement one or more aspects of the present disclosure. The example blocks will also be described with respect to base station 1000 as illustrated in FIG. 10. FIG. 10 is a block diagram illustrating base station 1000 configured according to one or more aspects of the present disclosure. In some implementations, base station 1000 may include or correspond to base station 105 of FIGS. 1 and 2 or second base station 320 of FIGS. 3 and 4. Base station 1000 may include the structure, hardware, and components as illustrated for base station 105 of FIG. 2. For example, base station 1000 may include controller/processor 240, which operates to execute logic or computer instructions stored in memory 242, as well as controlling the components of base station 1000 that provide the features and functionality of base station 1000. Base station 1000, under control of controller/processor 240, may transmit and receive signals via wireless radios 901*a-t* and antennas 234*a-t*. Wireless radios 1001*a-t* may include various components and hardware, as illustrated in FIG. 2 for base station 105, including modulator/demodulators 232*a-t*, MIMO detector 236, receive processor 238, transmit processor 220, and TX MIMO processor 230.

At block 700, a second base station receives, from a first base station via a backhaul communication, an interference identification message indicating one or more interfering beams detected by a UE. The one or more interfering beams are generated by the second base station. The second base station is a neighboring base station of the first base station. For example, base station 1000 may execute, under control of controller/processor 240, interference identification message receive logic 1002 stored in memory 242. The execution environment of interference identification message receive logic 1002 provides the functionality for base station 1000 to receive an interference identification message from a first base station via a backhaul communication. The interference identification message indicates one or more interfering beams detected by a UE and generated by base station 1000.

At block 701, the second base station generates a scheduling message indicating a set of beams of the second base station that are scheduled for use in upcoming transmissions. For example, base station 1000 may execute, under control of controller/processor 240, scheduling message generation logic 1003 stored in memory 242. The execution environment of scheduling message generation logic 1003 provides the functionality for base station 1000 to generate a scheduling message that indicates a set of beams of base station 1000 that are scheduled for use in upcoming transmissions.

In some implementations, to generate the scheduling message, the second base station may schedule the set of beams for use in upcoming transmissions. For example, base station 1000 may execute, under control of controller/processor 240, scheduling logic 1005 stored in memory 242. The execution environment of scheduling logic 1005 provides the functionality for base station 1000 to schedule the set of beams for use in upcoming transmissions. In some implementations, execution of scheduling logic 1005 may schedule the set of beams independent of the interference identification message. In some other implementations, execution of scheduling logic 1005 may schedule the set of beams based on the interference identification message (e.g., based on one or more groups of beams indicated in the interference identification message and/or one or more unconstrained time slots, one or more partially constrained time slots, one or more constrained time slots, or a combination thereof, indicated in the interference identification message).

At block 702, the second base station transmits, to the first base station via a second backhaul communication, the scheduling message. For example, base station 1000 may execute, under control of controller/processor 240, scheduling message transmit logic 1004 stored in memory 242. The execution environment of scheduling message transmit logic 1004 provides the functionality for base station 1000 to transmit, to the first base station via a second backhaul communication, the scheduling message.

In some aspects, techniques for enabling UE-assisted beam selection at neighboring cells may include additional aspects, such as any single aspect or any combination of aspects described below or in connection with one or more other processes or devices described elsewhere herein. In some aspects, enabling UE-assisted beam selection at neighboring cells may include an apparatus configured to detect, at a UE associated with a first base station, one or more interfering beams generated by a second base station. The second base station is a neighboring base station of the first base station. The apparatus may also be configured to transmit, to the first base station, an interference identification message indicating the one or more interfering beams. The apparatus may further be configured to receive, from the first base station, a scheduling message indicating a set of beams of the second base station that are scheduled for use in upcoming transmissions. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a first aspect, the one or more interfering beams correspond to interference that satisfies an interference threshold.

In a second aspect, alone or in combination with the first aspect, detecting the one or more interfering beams includes fixing, at the apparatus, receiver spatial quasi co-location (QCL) to the first base station, and measuring interferer reference signal received power (RSRP).

In a third aspect, in combination with the second aspect, the RSRP is measured based on interferer synchronization signal block (SSB) beams.

In a fourth aspect, in combination with the second aspect, the RSRP is measured based on a channel state information reference signal (CSI-RS).

In a fifth aspect, alone or in combination with one or more of the first through fourth aspects, detecting the one or more interfering beams includes sweeping, at the apparatus, receiver spatial quasi co-location (QCL) across multiple receive beams, and measuring reference signal received power (RSRP) for each receive beam of the multiple receive beams.

In a sixth aspect, alone or in combination with one or more of the first through fifth aspects, the one or more interfering beams are the strongest beams of a strongest cell, and the strongest cell corresponds to the second base station.

In a seventh aspect, in combination with the sixth aspect, the apparatus determines a maximum reference signal received power (RSRP) over all beams per cell to determine the strongest cell.

In an eighth aspect, in combination with the sixth aspect, the apparatus determines an average reference signal received power (RSRP) over the strongest beams to determine the strongest cell.

In a ninth aspect, alone or in combination with one or more of the first through eighth aspects, the interference identification message includes physical cell identity (PCI) information corresponding to the one or more interfering beams and synchronization signal block (SSB) beam identifiers corresponding to the one or more interfering beams, other transmission configuration indication (TCI) state reference corresponding to the one or more interfering beams, or both.

In a tenth aspect, alone or in combination with one or more of the first through ninth aspects, scheduling of the set of beams at the second base station is independent of the interference identification message.

In an eleventh aspect, alone or in combination with one or more of the first through tenth aspects, the scheduling message includes a list of the set of beams scheduled for transmissions.

In a twelfth aspect, alone or in combination with one or more of the first through eleventh aspects, the scheduling message includes a bitmap, and wherein each value of the bitmap corresponds to a different beam of the set of beams.

In a thirteenth aspect, alone or in combination with one or more of the first through twelfth aspects, the interference identification message includes multiple groups of beams corresponding to different requests from the UE.

In a fourteenth aspect, in combination with the thirteenth aspect, the multiple groups of beams include a first group of beams corresponding to unconstrained transmission parameters, a second group of beams corresponding to partially constrained transmission parameters, a third group of beams corresponding to constrained beams, or a combination thereof.

In a fifteenth aspect, in combination with the fourteenth aspect, the partially constrained transmission parameters include rank, transmission power, precoding, or a combination thereof.

In a sixteenth aspect, in combination with one or more of the fourteenth through fifteenth aspects, the constrained beams correspond to an interference level at the UE that satisfies a threshold.

In a seventeenth aspect, in combination with one or more of the fourteenth through sixteenth aspects, the scheduling message indicates a schedule at the second base station that takes into account one or more of the different requests from the UE.

In some aspects, an apparatus configured for wireless communication, such as a wireless communication device, is configured to receive, from a UE at a first base station, an interference identification message indicating one or more interfering beams detected by the UE. The one or more interfering beams are generated by a second base station that is a neighboring base station of the first base station. The apparatus is further configured to transmit, to the second base station via a backhaul communication, the interference identification message. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In an eighteenth aspect, the apparatus receives, from the second base station via a second backhaul communication, a scheduling message indicating a set of beams of the second base station that are scheduled for use in upcoming transmissions, and transmits, to the UE, the scheduling message.

In a nineteenth aspect, alone or in combination with the eighteenth aspect, the apparatus transmits, to one or more additional base stations via one or more additional backhaul communications, the interference identification message. The interference identification message indicates beams corresponding to each of the one or more additional base stations.

In a twentieth aspect, in combination with the nineteenth aspect, the apparatus receives, from the one or more additional base stations via one or more second additional backhaul communications, one or more additional scheduling messages indicating one or more sets of beams of the one or more additional base stations that are scheduled for use in upcoming transmissions.

In a twenty-first aspect, in combination with one or more of the nineteenth through twentieth aspects, the apparatus transmits, to the UE, the one or more additional scheduling messages.

In a twenty-second aspect, alone or in combination with one or more of the eighteenth through twenty-first aspects, the interference identification message includes physical cell identity (PCI) information corresponding to the one or more interfering beams and synchronization signal block (SSB) beam identifiers corresponding to the one or more interfering beams, other transmission configuration indication (TCI) state reference corresponding to the one or more interfering beams, or both.

In some aspects, an apparatus configured for wireless communication, such as a wireless communication device, is configured to receive, from a first base station at a second base station via a backhaul communication, an interference identification message indicating one or more interfering beams detected by a UE. The one or more interfering beams are generated by the second base station. The second base station is a neighboring base station of the first base station. The apparatus is also configured to generate a scheduling message indicating a set of beams of the second base station that are scheduled for use in upcoming transmissions. The apparatus is further configured to transmit, to the first base station via a second backhaul communication, the scheduling message. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In twenty-third aspect, the interference identification message includes physical cell identity (PCI) information corresponding to the one or more interfering beams and synchronization signal block (SSB) beam identifiers corresponding to the one or more interfering beams, other transmission configuration indication (TCI) state reference corresponding to the one or more interfering beams, or both.

In a twenty-fourth aspect, alone or in combination with the twenty-third aspect, the scheduling of the set of beams is independent of the interference identification message.

In a twenty-fifth aspect, alone or in combination with one or more of the twenty-third through twenty-fourth aspects, the scheduling message includes a list of the set of beams scheduled for transmissions or a bitmap, and wherein each value of the bitmap corresponds to a different beam of the set of beams.

In a twenty-sixth aspect, alone or in combination with one or more of the twenty-third through twenty-fifth aspects, the apparatus schedules, during one or more unconstrained time slots indicated by the interference identification message, at least one of the one or more interfering beams for transmission.

In a twenty-seventh aspect, alone or in combination with one or more of the twenty-third through twenty-sixth aspects, the apparatus schedules, during one or more partially constrained time slots indicated by the interference identification message, at least one of the one or more interfering beams for transmission with constrained parameters. The constrained parameters include reduced rank, limited transmission power, restricted precoding, or a combination thereof.

In a twenty-eighth aspect, alone or in combination with one or more of the twenty-third through twenty-seventh aspects, the apparatus refrains from scheduling, during one or more constrained time slots indicated by the interference identification message, any of the one or more interfering beams for transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-4 and 8-10) may comprise processors, electronics devices, hardware devices, electronics components, logical circuits, memories, software codes, firmware codes, etc., or any combination thereof. In addition, features discussed herein relating to 1-4 and 8-10 may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 5-7) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be implemented directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items may be employed by itself, or any combination of two or more of the listed items may be employed. For example, if a composition is described as containing components A, B, and/or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, the method comprising:
   detecting, at a user equipment (UE) located within a first serving cell served by a first base station, one or more interfering beams generated by a second base station, wherein the second base station is a neighboring base station of the first base station and the second base station is configured to serve a second serving cell that neighbors the first serving cell;
   transmitting, from the UE to the first base station, an interference identification message indicating the one or more interfering beams, wherein transmission of the interference identification message to the first base station causes transmission of the interference identification message from the first base station to the second base station, wherein the interference identification message includes multiple groups of beams corresponding to different requests from the UE, and wherein the multiple groups of beams include a first group of beams corresponding to unconstrained transmission parameters, a second group of beams corresponding to partially constrained transmission parameters, a third group of beams corresponding to constrained beams, or a combination thereof; and receiving, from the first base station, a scheduling message indicating a set of beams of the second base station that are scheduled for use in upcoming transmissions to one or more UEs within the second serving cell, the scheduling message received by the first base station in response to transmission of the interference identification message to the second base station.

2. The method of claim 1, wherein the one or more interfering beams correspond to interference that satisfies an interference threshold.

3. The method of claim 1, wherein detecting the one or more interfering beams comprises:
   fixing, at the UE, receiver spatial quasi co-location (QCL) to the first base station; and
   measuring interferer reference signal received power (RSRP).

4. The method of claim 3, wherein the RSRP is measured based on interferer synchronization signal block (SSB) beams.

5. The method of claim 3, wherein the RSRP is measured based on a channel state information reference signal (CSI-RS).

6. The method of claim 1, wherein detecting the one or more interfering beams comprises:
   sweeping, at the UE, receiver spatial quasi co-location (QCL) across multiple receive beams; and
   measuring reference signal received power (RSRP) for each receive beam of the multiple receive beams.

7. The method of claim 1, wherein the one or more interfering beams are the strongest beams of a strongest cell, the strongest cell corresponding to the second base station.

8. The method of claim 7, further comprising determining a maximum reference signal received power (RSRP) over all beams per cell to determine the strongest cell.

9. The method of claim 7, further comprising determining an average reference signal received power (RSRP) over the strongest beams to determine the strongest cell.

10. The method of claim 1, wherein the interference identification message includes, for each interfering beam of the one or more interfering beams, physical cell identity (PCI) information corresponding to the interfering beam and a synchronization signal block (SSB) beam identifier corresponding to the interfering beam.

11. An apparatus configured for wireless communication, the apparatus comprising:
    at least one processor; and
    a memory coupled to the at least one processor,
    wherein the at least one processor is configured to:
        detect, at a user equipment (UE) located within a first serving cell served by a first base station, one or more interfering beams generated by a second base station, wherein the second base station is a neighboring base station of the first base station and the second base station is configured to serve a second serving cell that neighbors the first serving cell;
        initiate transmission, from the UE to the first base station, of an interference identification message indicating the one or more interfering beams, wherein transmission of the interference identification message to the first base station causes transmission of the interference identification message from the first base station to the second base station, wherein the interference identification message includes multiple groups of beams corresponding to different requests from the UE, and wherein the multiple groups of beams include a first group of beams corresponding to unconstrained transmission parameters, a second group of beams corresponding to partially constrained transmission parameters, a third group of beams corresponding to constrained beams, or a combination thereof; and
        receive, from the first base station, a scheduling message indicating a set of beams of the second base station that are scheduled for use in upcoming transmissions to one or more UEs within the second serving cell, the scheduling message received by the first base station in response to transmission of the interference identification message to the second base station.

12. The apparatus of claim 11, wherein scheduling of the set of beams at the second base station is independent of any requests included in the interference identification message.

13. The apparatus of claim 11, wherein the scheduling message includes a list of the set of beams scheduled for transmissions to the one or more UEs within the second serving cell.

14. The apparatus of claim 11, wherein the scheduling message includes a bitmap, and wherein each value of the bitmap corresponds to a different beam of the set of beams.

15. The apparatus of claim 11, wherein the partially constrained transmission parameters include rank, transmission power, precoding, or a combination thereof.

16. The apparatus of claim 11, wherein the constrained beams correspond to an interference level at the UE that satisfies a threshold.

17. The apparatus of claim 11, wherein the scheduling message indicates a schedule at the second base station that takes into account one or more of the different requests from the UE.

18. A method of wireless communication, the method comprising:
    receiving, at a first base station from a user equipment (UE) located within a first serving cell served by the first base station, an interference identification message indicating one or more interfering beams detected by the UE, the one or more interfering beams generated by a second base station that is a neighboring base station of the first base station and that serves a second serving cell that neighbors the first serving cell;
    transmitting, from the first base station to the second base station via a backhaul communication, the interference identification message, wherein the interference identification message includes multiple groups of beams corresponding to different requests from the UE, and wherein the multiple groups of beams include a first group of beams corresponding to unconstrained transmission parameters, a second group of beams corresponding to partially constrained transmission parameters, a third group of beams corresponding to constrained beams, or a combination thereof; and
    in response to transmission of the interference identification to the second base station, receiving, at the first base station from the second base station via a second backhaul communication, a scheduling message indicating a set of beams of the second base station that are scheduled for use in upcoming transmissions to one or more UEs within the second serving cell.

19. The method of claim 18, further comprising:
transmitting, from the first base station to the UE, the scheduling message.

20. The method of claim 18, further comprising:
transmitting, from the first base station to one or more additional base stations via one or more additional backhaul communications, the interference identification message, wherein the interference identification message indicates beams corresponding to each of the one or more additional base stations;
receiving, at the first base station from the one or more additional base stations via one or more second additional backhaul communications, one or more additional scheduling messages indicating one or more sets of beams of the one or more additional base stations that are scheduled for use in upcoming transmissions to UEs within one or more serving cells served by the one or more additional base stations; and
transmitting, from the first base station to the UE, the one or more additional scheduling messages.

21. The method of claim 18, wherein the interference identification message includes, for each interfering beam of the one or more interfering beams, a transmission configuration indication (TCI) state corresponding to the interfering beam.

22. A method of wireless communication, the method comprising:
receiving, from a first base station at a second base station via a backhaul communication, an interference identification message indicating one or more interfering beams detected by a user equipment (UE) located within a first serving cell served by the first base station, the one or more interfering beams generated by the second base station, wherein the second base station is a neighboring base station of the first base station and serves a second serving cell that neighbors the first serving cell, wherein the interference identification message includes multiple groups of beams corresponding to different requests from the UE, and wherein the multiple groups of beams include a first group of beams corresponding to unconstrained transmission parameters, a second group of beams corresponding to partially constrained transmission parameters, a third group of beams corresponding to constrained beams, or a combination thereof;
in response to receiving the interference identification message from the first base station, generating, at the second base station, a scheduling message indicating a set of beams of the second base station that are scheduled for use in upcoming transmissions to one or more UEs within the second serving cell; and
transmitting, from the second base station to the first base station via a second backhaul communication, the scheduling message.

23. The method of claim 22, wherein the interference identification message includes, for each interfering beam of the one or more interfering beams, physical cell identity (PCI) information corresponding to the interfering beam and a synchronization signal block (SSB) beam identifier corresponding to the interfering beam, a transmission configuration indication (TCI) state corresponding to the interfering beam, or both.

24. The method of claim 22, wherein the scheduling of the set of beams is independent of the interference identification message.

25. The method of claim 22, wherein the scheduling message includes a list of the set of beams scheduled for transmissions to the one or more UEs within the second serving cell.

26. The method of claim 22, further comprising scheduling, during one or more unconstrained time slots indicated by the interference identification message, at least one of the one or more interfering beams for transmission.

27. The method of claim 22, further comprising scheduling, during one or more partially constrained time slots indicated by the interference identification message, at least one of the one or more interfering beams for transmission with constrained parameters, wherein the constrained parameters comprise reduced rank, limited transmission power, restricted precoding, or a combination thereof.

28. The method of claim 22, further comprising refraining from scheduling, during one or more constrained time slots indicated by the interference identification message, any of the one or more interfering beams for transmission.

29. The method of claim 1, further comprising:
performing, at the UE, one or more operations to account for interference caused by the set of beams indicated in the scheduling message.

* * * * *